(12) United States Patent
Hori et al.

(10) Patent No.: US 6,999,733 B2
(45) Date of Patent: Feb. 14, 2006

(54) PEAK FACTOR REDUCTION DEVICE

(75) Inventors: Kazuyuki Hori, Tokyo (JP); Takashi Yano, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 442 days.

(21) Appl. No.: 10/412,247

(22) Filed: Apr. 14, 2003

(65) Prior Publication Data

US 2004/0100210 A1      May 27, 2004

(30) Foreign Application Priority Data

Nov. 26, 2002 (JP) .............................. 2002-341670

(51) Int. Cl.
*H04B 1/04* (2006.01)

(52) U.S. Cl. ................... 455/114.2; 455/312

(58) Field of Classification Search ............. 455/114.2, 455/232.1, 234.1, 234.2, 308–309, 312; 375/130, 375/295–296, 345–346; 327/551
See application file for complete search history.

(56) References Cited

U.S. PATENT DOCUMENTS 6,449,302 B2 * 9/2002 Hunton ....................... 375/130
2005/0163248 A1 * 7/2005 Berangi et al. ............. 375/296

FOREIGN PATENT DOCUMENTS

JP      10-126309      5/1998

* cited by examiner

*Primary Examiner*—Nguyen T. Vo
(74) *Attorney, Agent, or Firm*—Antonelli, Terry, Stout and Kraus, LLP

(57) ABSTRACT

In the conventional peak factor reduction technique, since the signal has been changed over broad time width before and behind the peak amplitude, the deterioration in signal quality has been great. Through the use of a compensating signal having impulse property that is generated on the peak amplitude, subtraction from the peak amplitude will be performed. Thereby, since it is possible to reduce the deterioration in signal quality that occurs when reducing the peak factor, the peak factor reduction effect can be further enhanced in the same deterioration in signal quality as the conventional one.

15 Claims, 12 Drawing Sheets

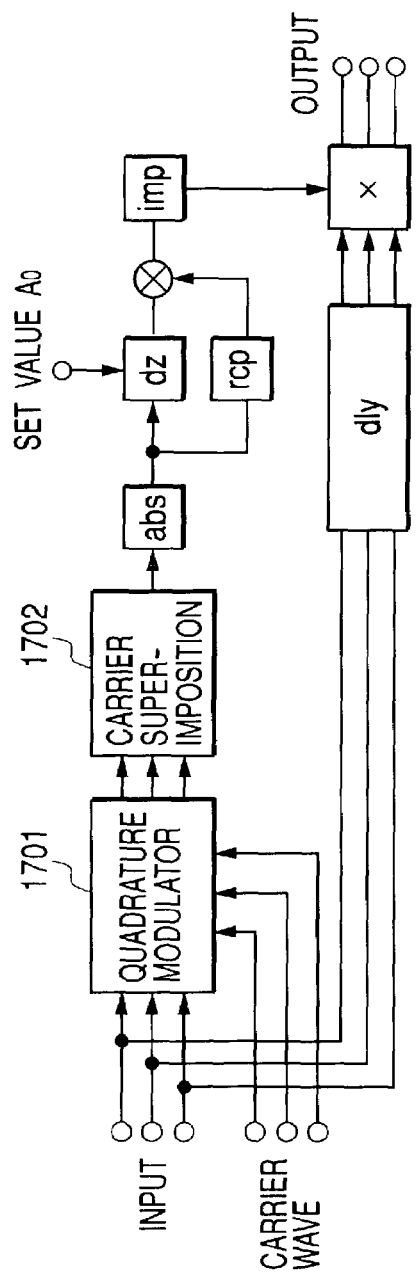
FIG. 17
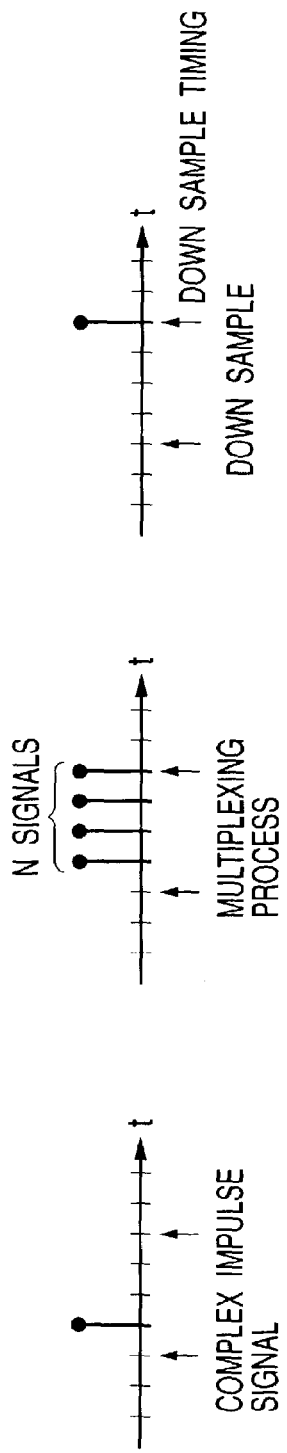
FIG. 18A
FIG. 18B
FIG. 18C

PEAK FACTOR REDUCTION DEVICE

BACKGROUND OF THE INVENTION

1. Field of the Invention

The present invention relates to a base band signal processing device for a radio transmitter to be used for a mobile communication base station and the like, and more particularly to a base band signal processing device for CDMA base station requiring handling of a signal that conforms to normal distribution having a big peak factor.

2. Description of Related Art

In recent years, CDMA having high utilization efficiency of frequency resources as a mobile communication system, and capable of broad band/high multiplex communication has received attention. In the CDMA system, it is known that since base band signals of more than one channel are spread into non-correlated signals in an artificial way by means of spreading codes that intersect each other at right angles and are transmitted with their codes multiplexed, when a number of multiplexing is increased, a transmission I, Q signal approaches the normal distribution. A signal presenting the normal property generates larger instantaneous peak amplitude than 10 dB on mean transmission power although low in the occurrence probability. A ratio of the instantaneous maximum power to the average power of such a signal is generally referred to peak factor.

If when transmitting a normal property signal by a radio transmitter, sufficient linearity is not secured even for large instantaneous peak amplitude, non-linear distortion occurs outside the transmission frequency band to become a disturbing wave for other systems. Its amount of occurrence has been severely regulated by the radio wave laws and regulations.

Under such circumstances, the radio transmitter, a power amplifier at the final stage, in particular, is compelled to be operated with the mean transmission power sufficiently lowered from the saturated output power, and the power efficiency becomes incapable of being sufficiently raised, as a result, leading to a problem that the device size and the running cost will be increased.

In order to solve such a problem, there has been devised the technique referred to as the so-called distortion compensation, in various ways for linearizing the power amplifier to a high degree to enable large output operation, and on the other hand, there also exists a method for enabling a large output operation of the amplifier by changing the distribution form itself of the base band signal to suppress the amount of occurrence of peak amplitude.

In the case of the latter technique, the signal quality is intrinsically deteriorated, but since the frequency of occurrence of the peak amplitude is sufficiently low in terms of the probability, this has little effect on the signal quality deterioration, and deterioration within a standard established for the applied system will be accepted.

As a simplest example, there is conceived a method for cutting off peak amplitude through the use of a limiter circuit, but since there is produced a break point that is not smooth in the signal in this case, the spectrum will be spread. As another method, there is also conceivable a method for band-limiting the limiter circuit output through the use of a filter, but the peak amplitude is reproduced by an operation of convolution due to the filter. As a conventional example of the technique for solving such a problem, there is named the system described in the Patent Literature 1.

First, with reference to FIG. 10, the description will be made of the conventional technique. FIG. 11 shows an example of operating waveform of the conventional technique. From a white normal property signal inputted, first a large amplitude component is cut off by a limiter 1001. In the case where this is band-limited by a filter 1006, when smoothing by the filter 1006, there may be cases where a peak amplitude more than the amplitude cut off by the limiter 1001 is reproduced. This is due to the operation of convolution in the filter 1006. Thus, a filter 1002 having the same as or similar characteristic to the filter 1006 will be used as a reference filter, and this output signal will be supplied to an amplitude control unit 1004. When an output signal from the amplitude control unit 1004 detects a value higher than the set value of the amplitude control unit 1004 concerning peak amplitude reproduced by the reference filter 1002, the output value will be lowered by a time period in which the convolution occurs at the filter 1006 at the later stage, that is, a period corresponding to the tap length of the filter 1006. On the other hand, a delay circuit 1003 which opposes corrects the signal delay that occurs in the reference filter 1002. Since the gain of the signal delayed is controlled by a multiplier 1005 on the basis of the output from the amplitude control unit 1004, the output value of the amplitude control unit is set appropriately, whereby it is possible to prevent a peak amplitude to be reproduced by the filter 1006 from exceeding the threshold.

As described above, in the conventional technique, by operations at two stages: cutting off the large amplitude by the limiter 1001 and lowering the gain by the amplitude control circuit 1004, the peak amplitude is suppressed. However, since in the latter operation, the gain is uniformly lowered by a time period corresponding to the tap length of the filter 1006 in order to avoid the influence of convolution although the actual time interval in that the peak amplitude occurs is exceedingly short, the influence on the deterioration of the signal quality will be great. Also, in the conventional technique, no consideration has been given to a multi-carrier signal consisting of a plurality of modulation signals and carrier waves.

SUMMARY OF THE INVENTION

The present invention has been devised in order to solve the above-described problems of the conventional technique. According to the present invention, the signal is not uniformly changed over a fixed section corresponding to the tap length of the filter unlike the conventional technique, but such a correction signal as energy is concentrated only in close proximity to the peak amplitude is generated, and since the peak amplitude is erased on the basis of the correction signal, it is possible to reduce the influence on the deterioration of the signal quality.

Specifically, as shown in FIG. 1, an input signal is inputted to a reference filter 101 to observe peak amplitude that occurs when the band is limited. Next, the waveform of a portion by which the output from the reference filter 101 has exceeded the set value A0 will be extracted by means of the amplitude control unit 104. Next, an impulse signal having amplitude proportionate to the maximum value is caused to be generated at the time when the extracted waveform becomes a maximum, the input signal is delayed by a delay circuit 102 to time the input signal to the impulse signal in advance, and the impulse signal will be signal-subtracted from the delay circuit 102 output by an adder 103 for outputting.

When this is finally band-limited by a band limiting filter 105, peak amplitude to be generated by the input signal and impulse response amplitude to be generated by the impulse signal coincide with each other in position and amplitude on the basis of the principle of superposition of a linear circuit, and since the phase is reversed, the amplitude component that exceeded the peak is erased and the peak factor can be limited to the set value.

Even when the peak limit is incomplete and the error component remains as a result of offsetting of the impulse signals in the above-described processing, the peak factor reduction devices are connected in multistage and in tandem as shown in FIG. 2, whereby the peak limiting effect can be further enhanced.

BRIEF DESCRIPTION OF THE DRAWINGS

FIG. 17 shows an amplitude control unit according to the sixth embodiment of the present invention; and FIGS. 18A to 18C show an operation of a multiplexing unit according to the sixth embodiment of the present invention.

DETAILED DESCRIPTION OF THE PREFERRED EMBODIMENTS

Figure 3:
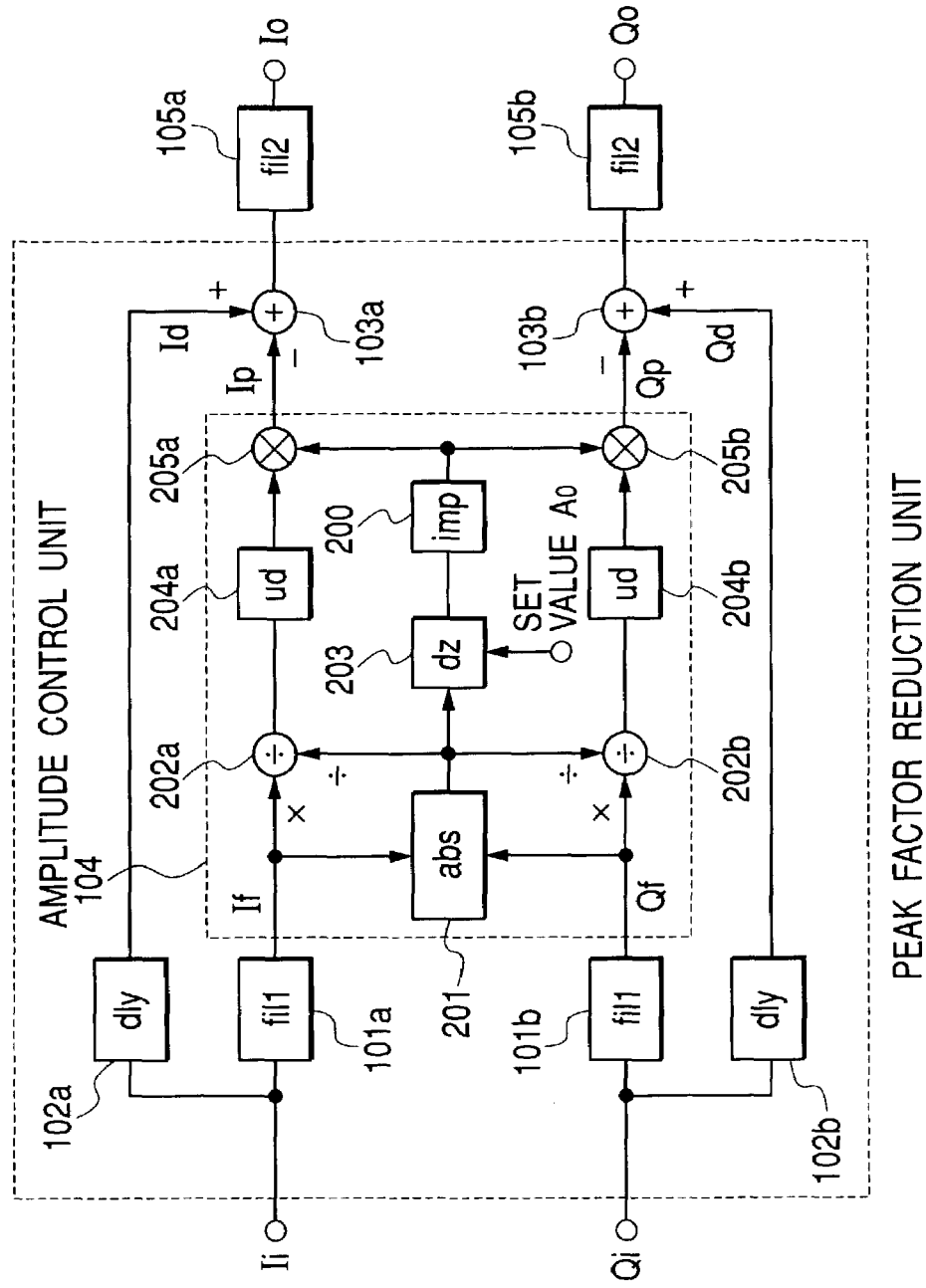
FIG. 3 shows a first embodiment according to the present invention.
Figure 6:
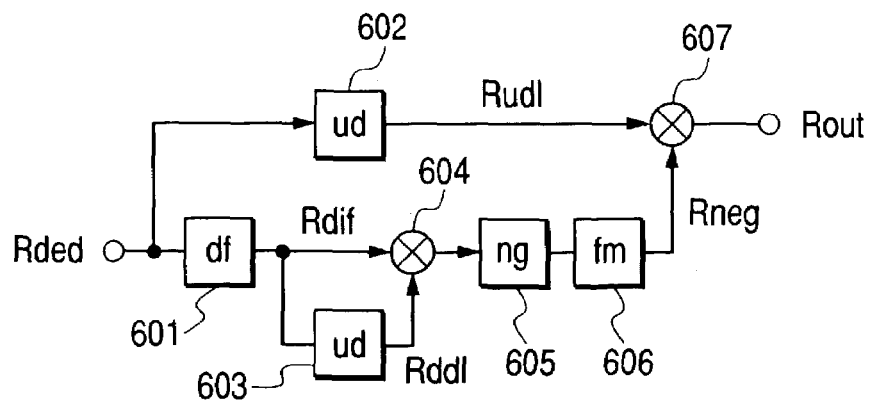
FIG. 6 shows an embodiment of an impulse generating circuit.

Hereinafter, with reference to the first embodiment shown in FIG. 3 and an embodiment of the impulse generating circuit shown in FIG. 6, the description will be made of details of the present invention. FIG. 3 shows a base band signal processing unit using a peak factor reduction device according to the present invention.

In the peak factor reduction device of FIG. 3, first each of a real part Ii and an imaginary part Qi of a normal property base band complex input signal having a uniform spectrum is band-limited by reference filters 101a and 101b. Impulse responses of the reference filters 101a and 101b are assumed to be the same as or exceedingly similar to those of band limiting filters 105a and 105b. Signals band-limited by the reference filters 101a and 101b have still normal property.

Figure 4:
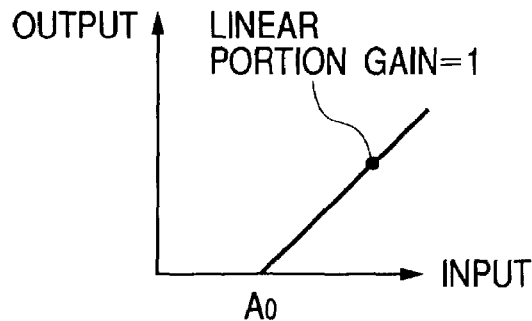
FIG. 4 shows input-output characteristic of a dead zone circuit 203.

Next, in an absolute value circuit 201, square sums of the real part and the imaginary part are calculated from the complex signal band-limited to take their square root, whereby an instantaneous amplitude component is generated. In a dead zone circuit 203, on the basis of the input-output characteristic of FIG. 4, an amplitude component higher than the set value A0 will be outputted from an output signal from the absolute value circuit 201. In order to realize the dead zone circuit 203, the set value A0 can be subtracted from, for example, an input signal to forcibly change the negative output to zero. Output from the dead zone circuit 203 is supplied to an impulse generating circuit.

Since an input signal Rded to an impulse generating circuit 200 has been obtained by extracting a waveform of a peak portion of the instantaneous amplitude of a complex signal, it is of such waveform as angular soliton continues.

This waveform will be differentiated by a differentiation circuit 601. The differential operation here is to calculate a difference between two samples which are successive, and can be realized by such a simple FIR digital filter whose example of impulse response is [1, −1]. As a result, in a section in which signals are increased, a positive output value is obtained, while in a section in which signals are decreased, a negative output value is obtained. When this output Rdif is delayed by one sample by a delay circuit 603 and the product with the original signal is obtained by a multiplier 604, only a sample at the moment when Rdif shifts from positive to negative becomes negative output, and the rest all becomes zero or positive output.

Figure 5:
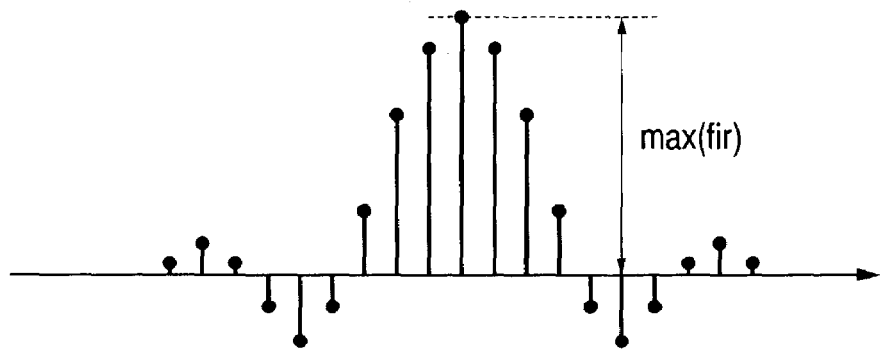
FIG. 5 shows an example of impulse response of a filter.

Next, this will be judged by a negative value judgment circuit 605, and if unit amplitude of a positive value, that is, 1 is outputted only when the negative value is inputted, this will become an impulse signal. The negative value judgment circuit 605 can be realized by an operation of taking out, for example, a code bit. Output from the negative value judgment circuit 605 obtains a signal Rneg by normalizing at a fixed value max(fir) by a gain circuit 606. The fixed value max(fir) is the maximum value of impulse response of the band limiting filter 105 as shown in FIG. 5, and can be preset in advance.

Next, the product of output Rudl obtained by delaying the input signal Rded by one sample by the delay circuit 602 and Rneg is determined by a multiplier 607, whereby at a position where a maximum value occurs in the peak amplitude, an impulse signal having amplitude proportionate to the maximum value can be obtained.

On the other hand, output from the absolute value circuit 201 is divided by output from the reference filters 101a and 101b through the use of dividers 202a and 202b, whereby a cosine component and a sine component of a complex signal If+jQf are obtained. These are caused to be delayed by a time period corresponding to processing delay by the impulse generating circuit 200 through the use of delay circuits 204a and 204b to time in advance, and a product with output signal from the impulse generating circuit 200 is determined through the use of multipliers 205a and 205b, whereby a complex number is obtained and a complex impulse signal Ip+jQp can be generated.

Next, the input signal is caused to be delayed by a time period corresponding to processing delay of filters 101a and 101b and the impulse generating circuit 200 by delay circuits 102a and 102b for timing in advance, and the complex impulse signal is subtracted by adders 103a and 103b, whereby the peak factor reduction process is completed.

Finally, when an output signal from the peak factor reduction unit is band-limited by band limiting filters 105a and 105*b*, a peak amplitude component that appears when the input signal is band-limited and an impulse response component that appears when the complex impulse signal is band-limited coincide with each other in peak value and position on the basis of the principle of superposition in the linear circuit, and since the phase is reversed, an amplitude component that exceeds the peak is suppressed, and an effect of limiting the peak factor to the set value can be obtained.

Figure 15:
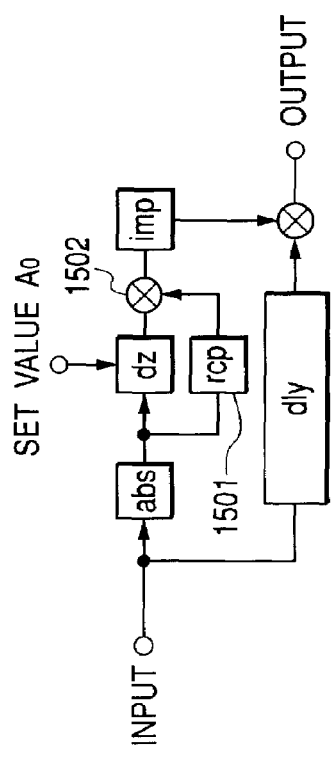
FIG. 15 shows an example of modification of the amplitude control unit.

In this respect, the amplitude control unit 104 shown in FIG. 3 is capable of various transformations, one example of which is shown in FIG. 15. In FIG. 15, in place of the dividers 202*a* and 202*b* in FIG. 3, the structure is arranged such that the result obtained by determining a reciprocal by a reciprocal circuit 1501 is multiplied by output from the dead zone circuit 203 by a multiplier 1502, and similar effect to FIG. 3 can be obtained even though transformed as described above.

Figure 7:
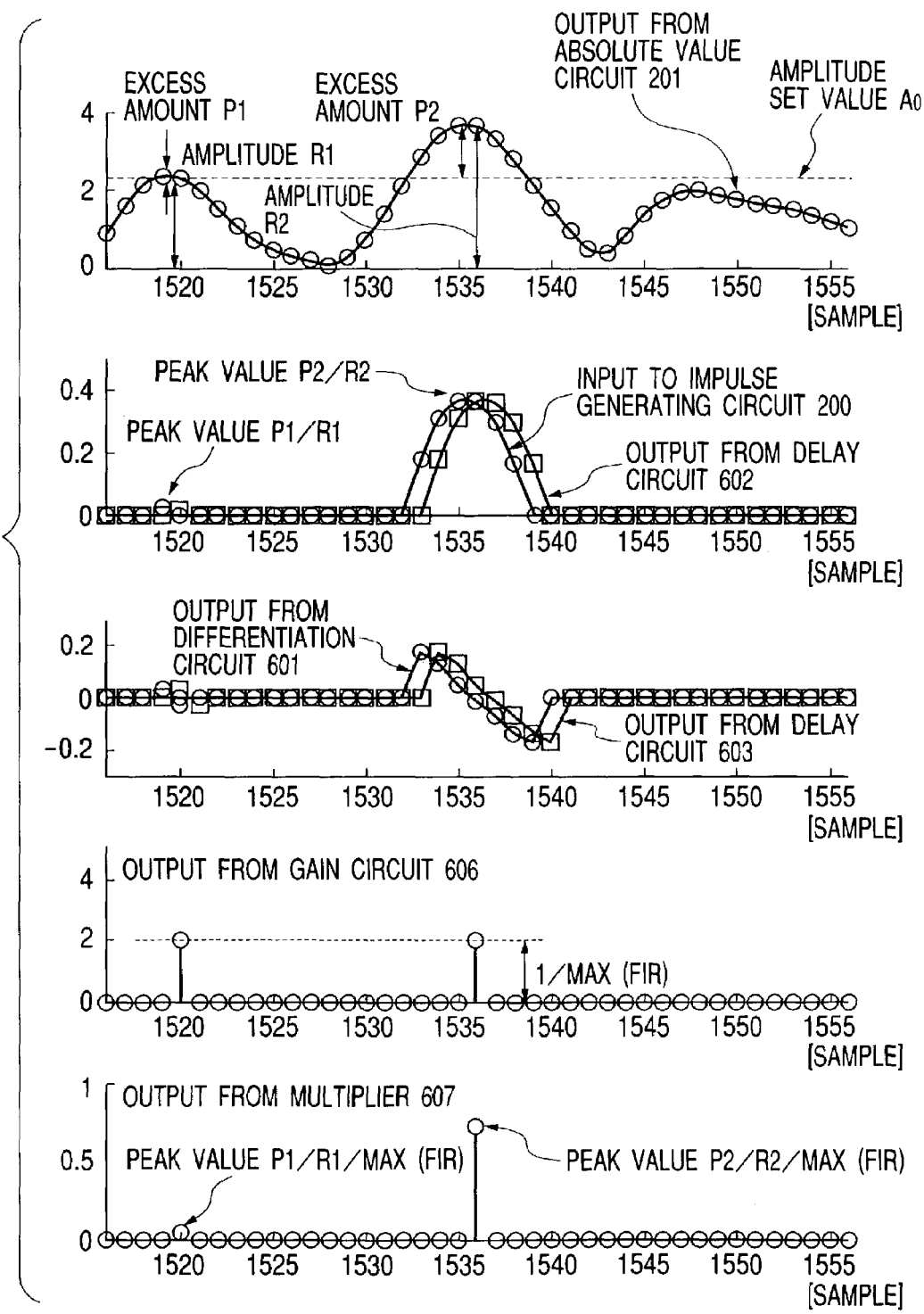
FIG. 7 shows an example of operating waveform of the impulse generating circuit.

With reference to FIG. 7, the description will be made of the operation of FIG. 15. FIG. 7 shows a portion of the waveform obtained by simulating FIG. 15. In this example, the set value A0 of the dead zone circuit has been set to about 2.3, and in the absolute value circuit 201 output, set value A0 exceeding amplitude P1 and P2 occurs at two places.

Next, input to the impulse generating circuit 200 is of waveform obtained by normalizing set value excess portion waveform to be obtained in the dead zone circuit 203 at the original amplitude r1, r2. The delay circuit 602 output has waveform obtained by delaying this by one sample.

In a differentiation circuit 601, waveform obtained by differentiating the input to the impulse generating circuit 200 with respect to time can be obtained. The delay circuit 603 output is of waveform obtained by delaying this by one sample.

In the gain circuit 606 output, at a position whereat the differentiation circuit 601 output and the delay circuit 603 output have different codes, an impulse signal having a peak value 1/max(fir) can be obtained. When this is multiplied by the delay circuit 602 output, an output signal from the impulse generating circuit can be obtained.

When an output signal from the impulse generating circuit 200 is multiplied by a signal that has delayed an input signal If+jQf to the amplitude control unit, a complex signal (If+jQf)P/r/max(fir) is given and complexion is performed. When this impulse signal complexed is processed by the band limiting filter 105, the max(fir) is offset in the output, and (If+jQf)P/r is given. Further, at its amplitude peak value, r is offset, and P is given, which coincides with the set value excess amplitude P of the dead zone circuit 203. Therefore, before the band limiting process is performed by the band limiting filter 105, a signal whose input has been delayed is subtracted by the adder 103 in advance, whereby it becomes possible to erase the peak amplitude component on the basis of the principle of superposition of the linear circuit.

Figure 8:
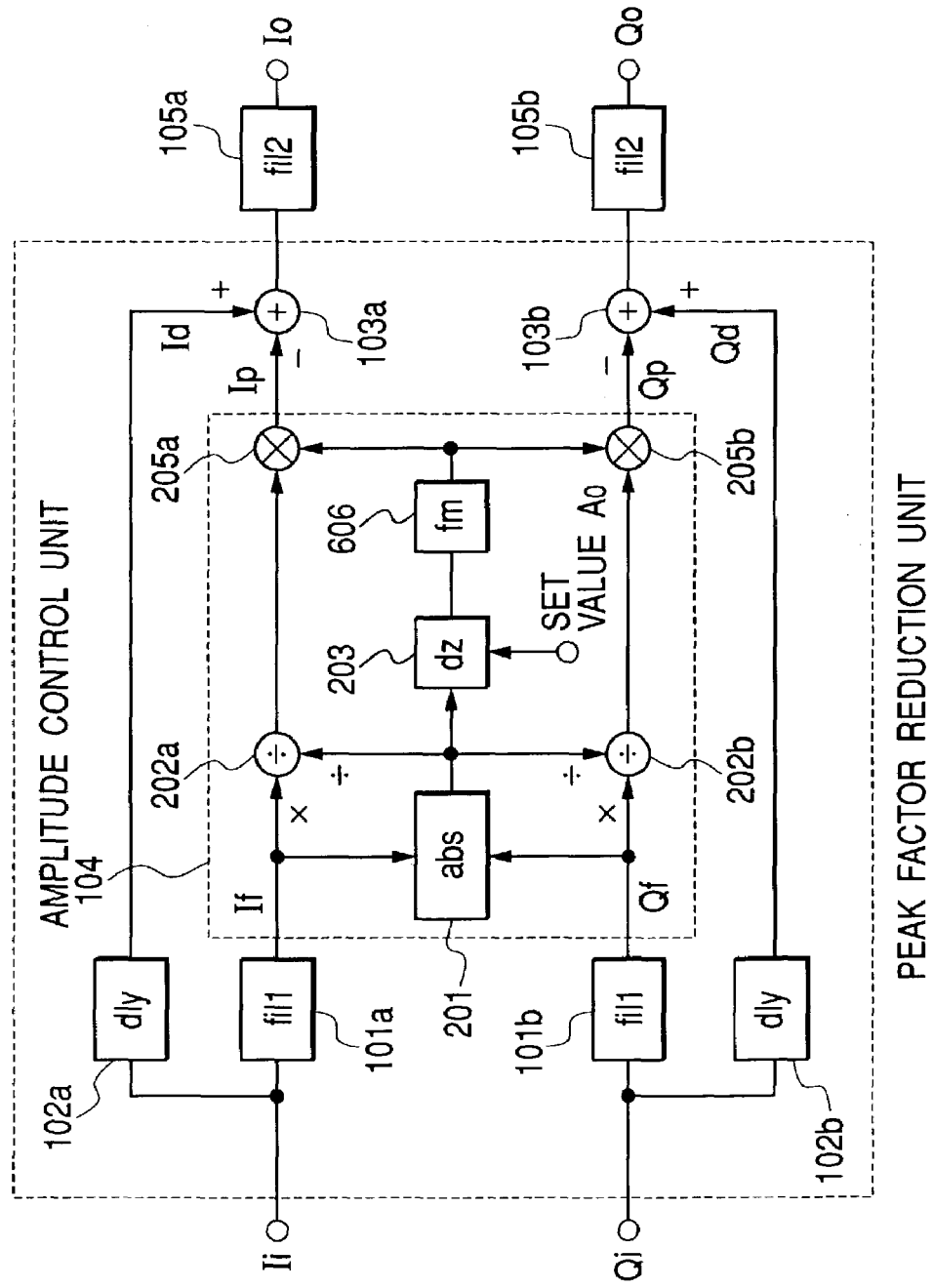
FIG. 8 shows a second embodiment according to the present invention.

Next, with reference to FIG. 8, the description will be made of the second embodiment according to the present invention. According to the present embodiment, the first embodiment of FIG. 3 shows a case where the impulse generating circuit 200 and the delay circuits 204*a* and 204*b* corresponding thereto are omitted and only an amplitude normalizing process is performed by the gain circuit 606.

When the peak amplitude of the complex input signal is close to the set value A0 of the dead zone circuit 203 in FIG. 3, the dead zone circuit outputs only an amount of one sample in close proximity to the peak amplitude. Therefore, since the dead zone circuit output has already become an impulse signal, the amplitude normalizing process will suffice, and the structure can be simplified by omitting the impulse generating circuit 200.

Figure 9:
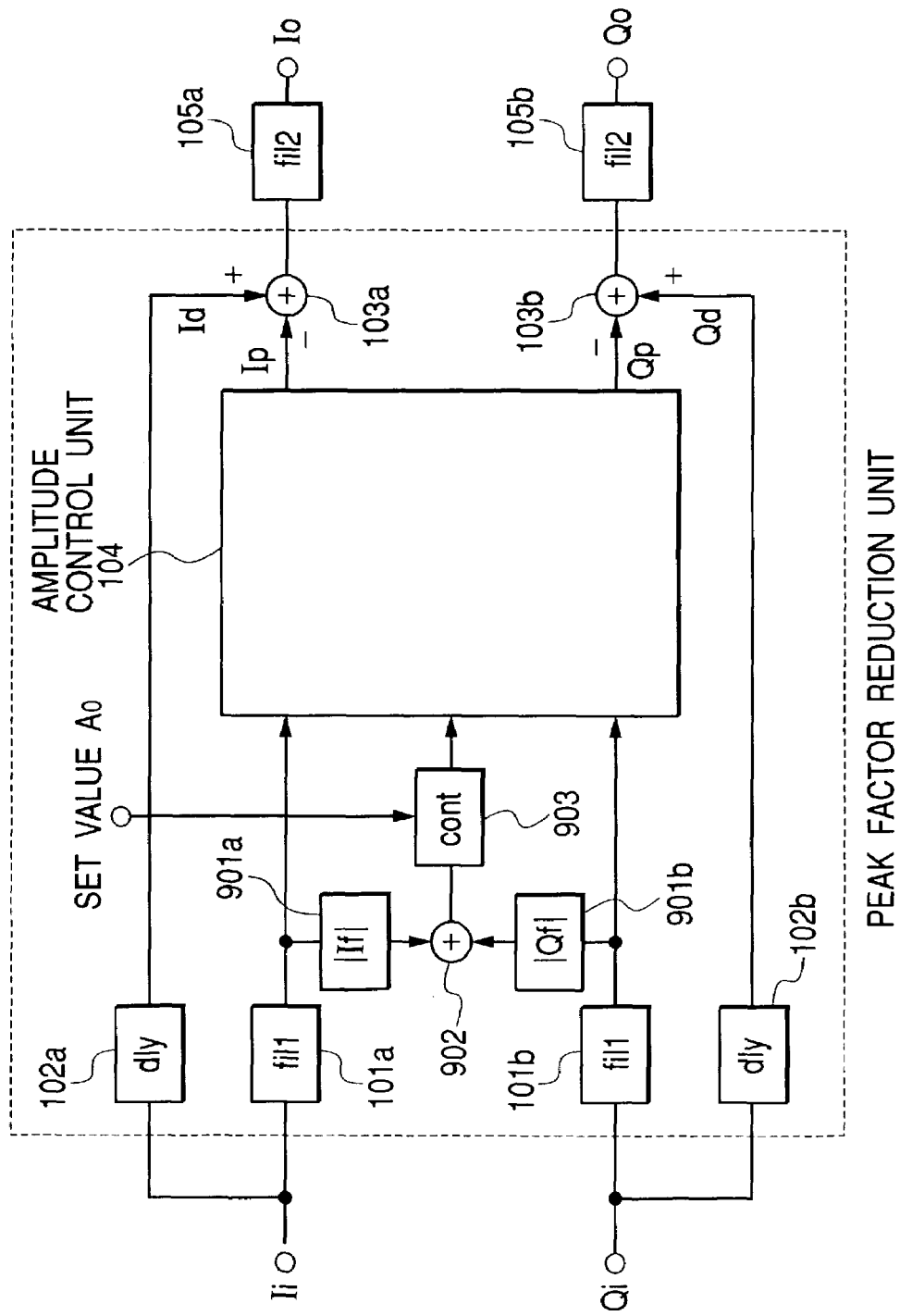
FIG. 9 shows a third embodiment according to the present invention.
Figure 10:
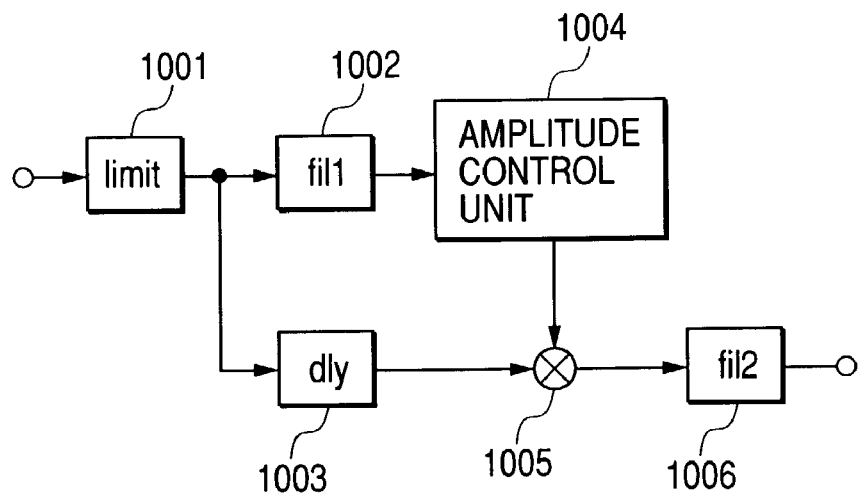
FIG. 10 shows the conventional technique.
Figure 11:
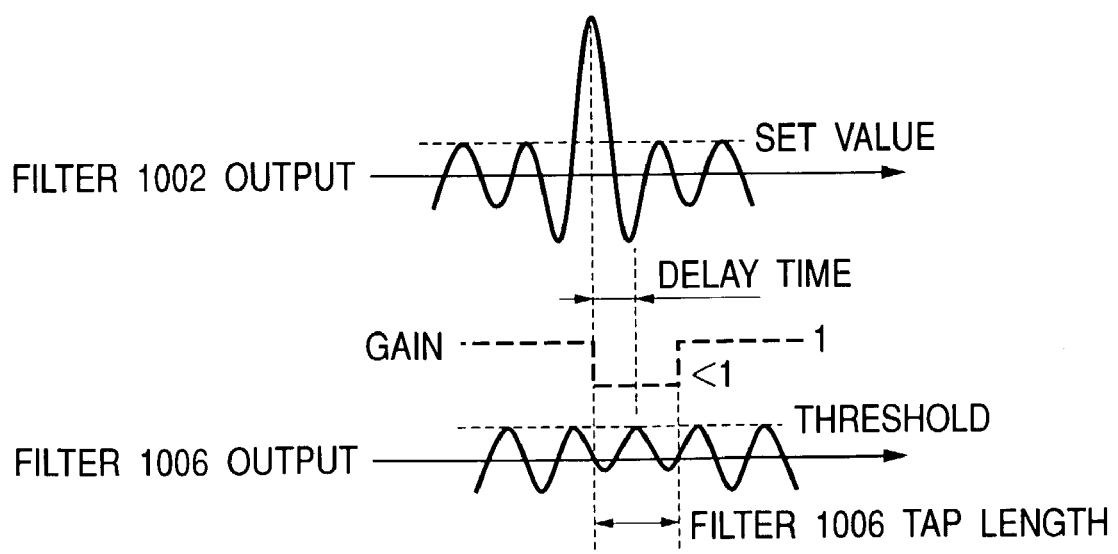
FIG. 11 shows an example of operating waveform according to the conventional technique.

Next, with reference to FIG. 9, the description will be made of the third embodiment according to the present invention. The present embodiment is constructed by adding, to a peak factor reduction unit according to the present invention, absolute value circuits 901*a* and 901*b* for taking absolute values of output from the reference filters 101*a* and 101*b*; an adder 902 for taking a sum of the absolute value circuits 901*a* and 901*b*; and a control circuit 903 for controlling so as to suspend the amplitude control unit 104 if the adder 902 output is below A0 on the basis of the same set value A0 as the dead zone circuit 203.

The amplitude control unit 104 requests an instantaneous amplitude component of the complex signal If+jQf by the absolute value circuit 201. At this time, since a triangular inequality |If|+|Qf|≧|If+jQf| holds concerning the complex signal, A0≧|If+jQf| will be formed if A0≧|If|+|Qf|. Therefore, the output from the absolute value circuit 201 is zero, and since there is no need for operating the amplitude control unit in this state, it can be left suspended. If the input signal is of normal property, the ratio of time during which the amplitude control unit 104 must operate to the entire operating time is exceedingly small. Therefore, it becomes possible to reduce the power consumption at the peak factor reduction unit according to the present invention.

Figure 12:
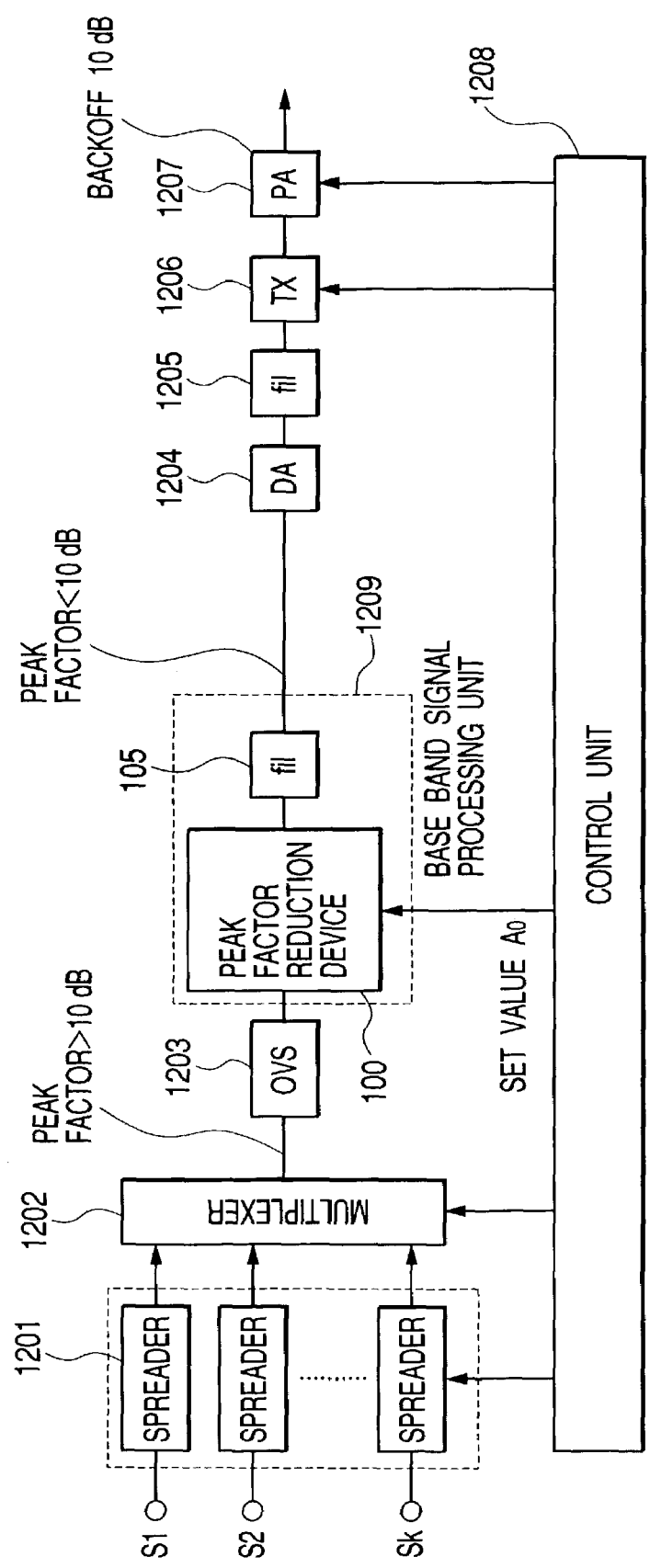
FIG. 12 shows a fourth embodiment according to the present invention.

Next, with reference to FIG. 12, the description will be made of the fourth embodiment according to the present invention. A radio transmitter according to the present invention shown in FIG. 12 is composed of: a spreader 1201 for spreading at least one or more digital modulation signals through the use of a spreading code; a multiplexing unit 1202 for multiplexing a signal spread; an interpolator 1203 for oversampling an output signal from the multiplexing unit; a peak factor reduction device 100 according to the present invention; a band-limiting filter 105 for band-limiting an output signal from the peak factor reduction device; a digital-to-analog converter 1204 for converting a digital output signal to an analog signal; a filter 1205 for smoothing an analog output signal; a frequency modulation unit 1206 for converting the signal band from base band to high-frequency; a power amplifier 1207 for performing signal amplification to a predetermined power; and a control unit 1208.

After the digital modulation signal is spread and multiplexed, a signal conforming to the normal distribution is to have a peak factor having 10 dB or more.

When transmitting a signal with such property with a power amplifier 1207 whose back-off (ratio of saturation output to average output) is 10 dB as an example without the aid of the peak factor reduction device 100 according to the present invention, saturation distortion will occur in the output signal because the amplitude component exceeding 10 dB is saturated by the power amplifier. At this time, since generally spectrum of the signal spreads, the spectrum in the spread portion becomes a disturbing wave to the outside of the transmission band such as, for example, the adjacent channel. Since this disturbing wave is very close to the transmission band, it is difficult to eliminate by a filter. For this reason, the power amplifier 1207 must be operated in a low distortion state by lowering the average output in accordance with the signal peak factor, which prevents the device from improving the efficiency.

On the other hand, according to an embodiment of the present invention, the peak factor is reduced within 10 dB in advance through the use of the peak factor reduction device 100, whereby the power amplifier 1207 is capable of prevent saturation distortion from occurring with the amplitude not reaching the saturation output. Therefore, it becomes possible to operate the device with high efficiency.

Also, a set value A0 of the peak factor reduction device is supplied from the control unit 1208, whereby it becomes possible to control to details in response to characteristics of the power amplifier 1207 to be mounted.

Figure 13:
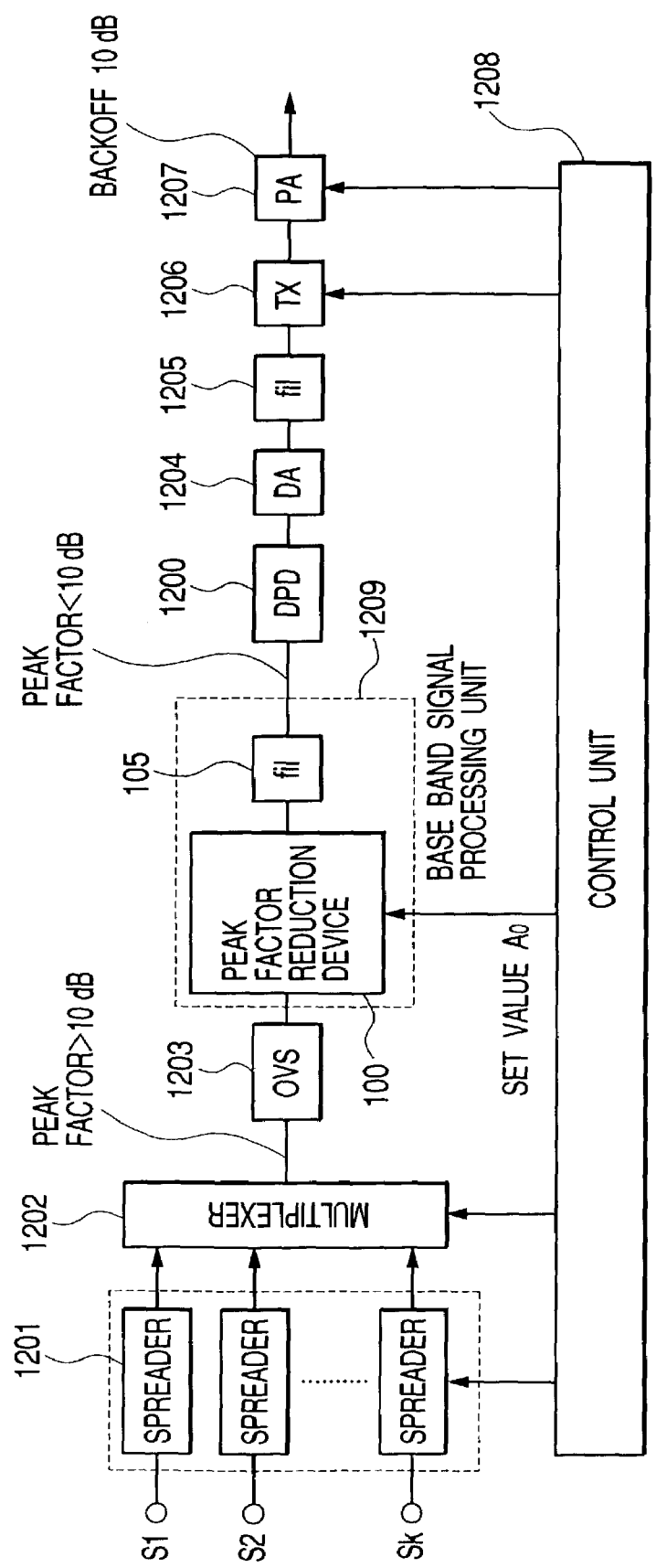
FIG. 13 shows a fifth embodiment according to the present invention.

Next, with reference to FIG. 13, the description will be made of the fifth embodiment according to the present invention. A radio transmitter according to the present invention, shown in FIG. 13 is characterized in that between the band limiting filter 105 and the digital-to-analog converter 1204 in the embodiment of FIG. 12, there is arranged a digital predistortion device 1200 having an inverse function of nonlinear input-output characteristic of the power amplifier 1207 as the input-output characteristic. The input-output characteristic of the power amplifier 1207 has non-linearity in a monotone increasing area except saturation of output in many instances. When such a power amplifier is used, it is possible to prevent saturation distortion from occurring by the embodiment of FIG. 12, but distortion based on the non-linearity occurs. For this reason, there is arranged the digital predistortion device 1200 having an inverse function of nonlinear input-output characteristic of the power amplifier 1207 as the input-output characteristic between the band limiting filter 105 and the digital-to-analog converter 1204, whereby as a result, it becomes possible to completely linearize the amplitude component below the peak factor, making it possible to prevent distortion from occurring in terms of the principle because the peak factor reduction device 100 operates on the saturation distortion while the digital predistortion device 1200 operates on the non-linear distortion.

Figure 1:
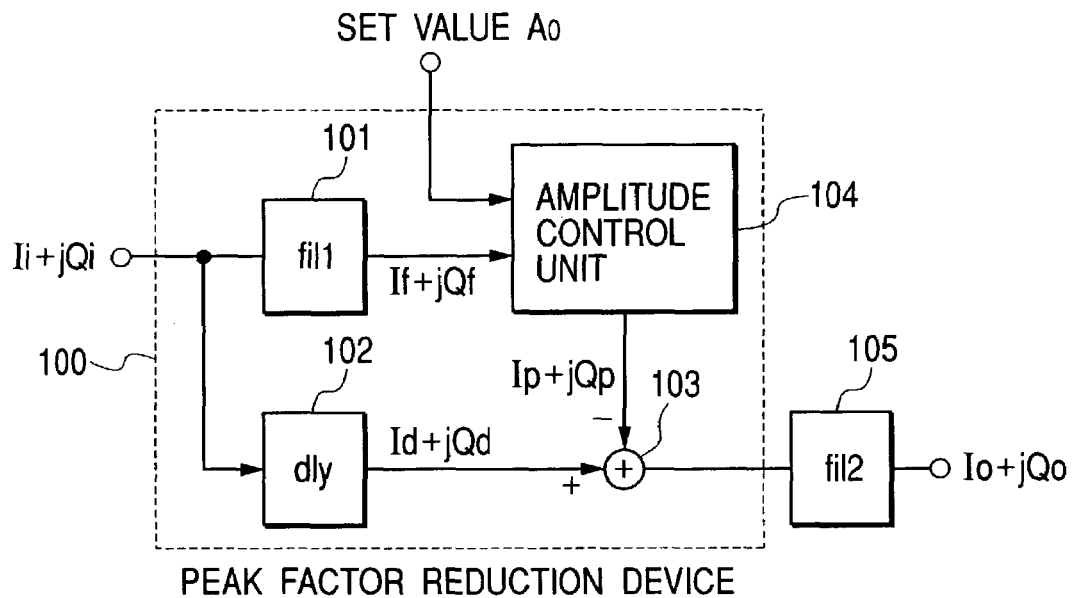
FIG. 1 is a first principle view according to the present invention.
Figure 2:
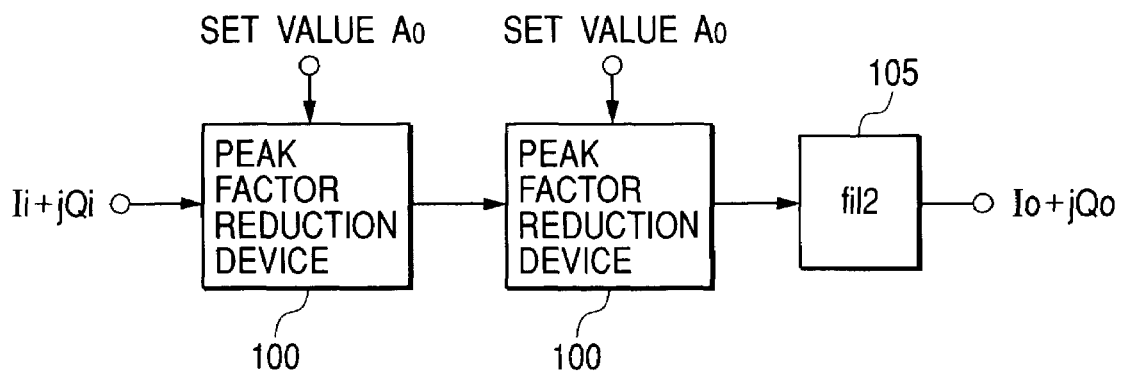
FIG. 2 is a second principle view according to the present invention.
Figure 14:
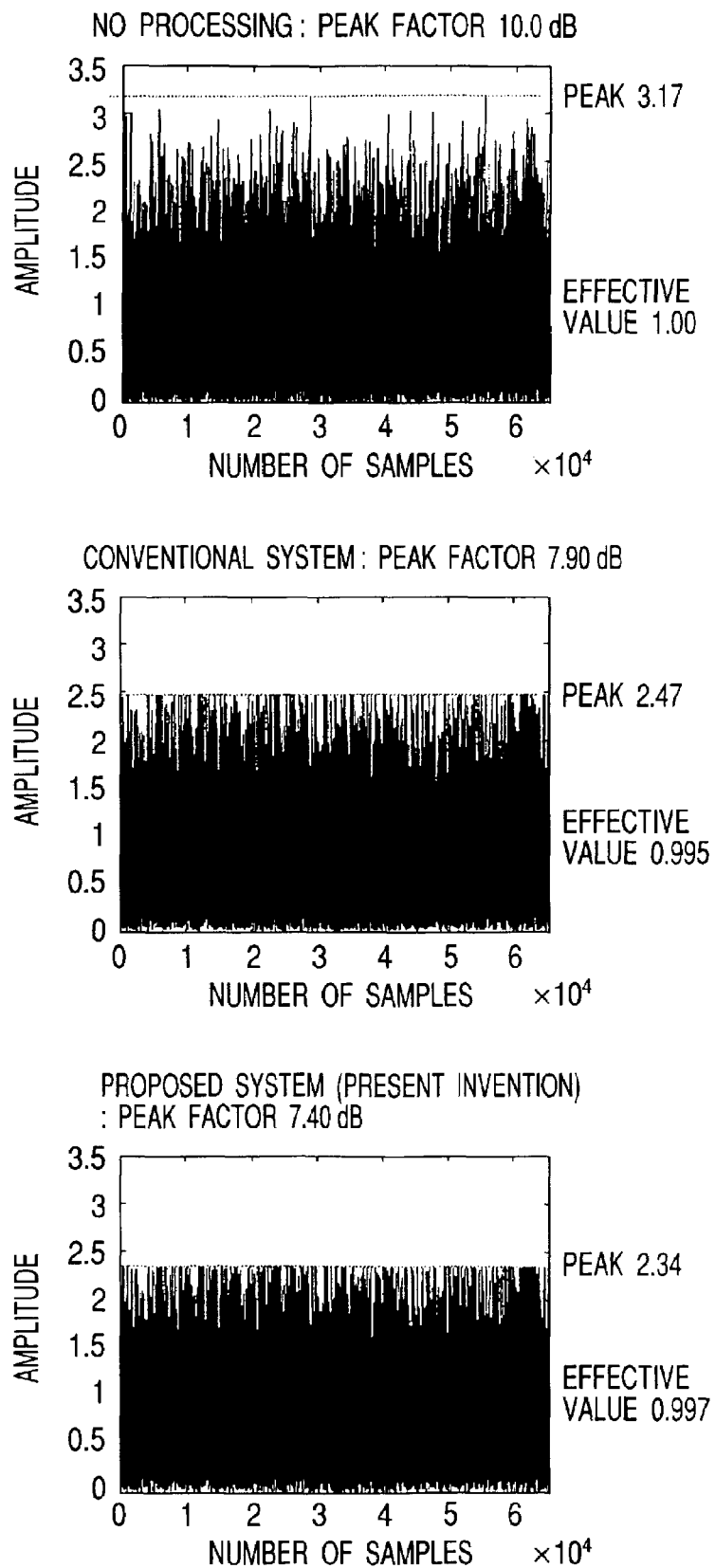
FIG. 14 shows the simulation result.

With reference to FIG. 14, the description will be made of the simulation result of the peak factor reduction device according to the present invention and the conventional technique. For the input signal, a signal obtained by over-sampling a complex normal distribution signal of 16384 points four times has been used, for the filter, a filter with 74 taps designed for CDMA base band filter has been used, and between non-processing, that is, a case where the band has been limited immediately after oversampling, and the conventional technique, absolute values of the complex signals obtained concerning the present invention have been plotted. As regards the present invention, the structure shown in FIG. 2 is used, and as regards the number of stages, two stages are used: in the first stage, the structure of FIG. 3 is used and in the second stage, the structure of FIG. 8 is used. As regards the deterioration in the signal quality, between the present invention and the conventional technique, the modulation precision represented by the following formula has been standardized at 3%.

$$\mathrm{sqrt}[\Sigma\{(Io-Ii)^2+(Qo-Qi)^2\}/N]/\mathrm{sqrt}[\Sigma\{Ii^2+Qi^2\}/N]$$

As the result of the simulation, the peak factor in the conventional technique is 7.90 dB, whereas in the present invention, an improvement effect of 0.5 dB has been obtained at 7.40 dB, and the effectiveness of the present invention has been confirmed.

Figure 16:
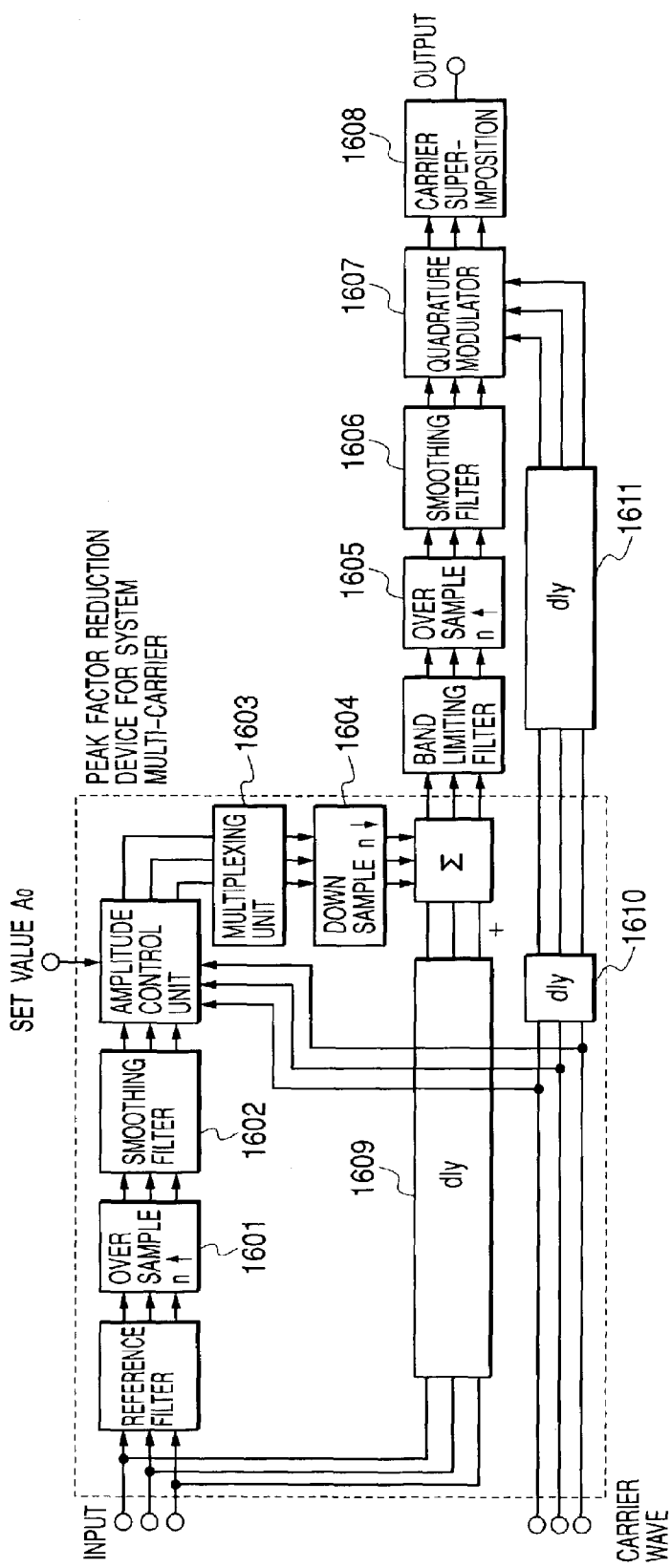
FIG. 16 shows a sixth embodiment according to the present invention.

Next, with reference to FIG. 16, the description will be made of the sixth embodiment according to the present invention. FIG. 16 shows an embodiment when a peak factor reduction device according to the present invention is expanded to a multi-carrier system, and an example of an equal detuning three-carrier system will be specifically described. In the present invention, the detuning frequency and carrier number are not particularly limited.

First, base band complex input signals of three systems are diverged respectively, and one is band-limited by the reference filter. However, in order to prevent the sample rate from being in short supply due to the carrier superimposition at the later stage, further an oversampling process for increasing the sample rate by interpolation due to an over-sampling circuit 1601 and a smoothing process for eliminating any unnecessary image frequency due to a smoothing filter 1602 will be performed.

Next, the amplitude control unit extracts waveform of a portion by which the amplitude component of a signal converted into multi-carrier has exceeded the set value A0 to generate an impulse signal obtained by normalizing the peak value by the amplitude component at a point of time when this waveform becomes a maximum. By multiplying this impulse signal by the input signal, a complex impulse signal can be obtained.

With reference to FIG. 17, the description will be made of an example of the structure of the amplitude control unit. In the amplitude control unit, an output signal from the smoothing filter is complex-multiplied by a quadrature modulator 1701, and is added and composed by a carrier superimposition device 1702 to thereby convert into a single complex signal converted into multi-carrier. Next, its amplitude (abs) will be taken out in the quite same manner as FIG. 15. As regards this amplitude information, after only waveform of the excess portion of the set value A0 is taken out by a dead zone circuit dz having the input-output characteristic shown in FIG. 4, a reciprocal (rcp) of the amplitude will be multiplied for normalization. An impulse generating circuit imp generates an impulse signal having amplitude proportionate to the maximum value at the time when the output waveform from the dead zone circuit dz normalized becomes a maximum. The impulse generating circuit adopts structure similar to FIG. 6, and the gain of the gain circuit 606 is set to 1/(max(fir)max(fil)n) assuming the maximum value of impulse response of the band limiting filter 101 as max(fir), an oversampling rate in the over-sampling circuit 1601 as n, and the maximum value of impulse response of the smoothing filter 1602 as max(fil).

When the impulse generating circuit output is multiplied by a signal obtained by delaying the input signal by one sample, an impulse signal having amplitude proportionate to the maximum value can be obtained at the time when the maximum value occurs in the peak amplitude.

Next, subtraction between a signal obtained by delaying an input signal by a delay circuit 1609 and the impulse signal will be performed. Since the signal obtained by delaying the input signal and the complex impulse signal are different in sample rate and the subtraction cannot be performed as they are, it is necessary to lower the sample rate of the complex impulse signal by a down sample. However, since the signal is impulse in the simple down sample, an unexpected defeat through carelessness is likely to occur depending upon the pulse generating position.

If the sample rate of the input complex signal is raised in advance as this countermeasure, the band limiting filter will have to meet the high sample rate, and the need for increasing the tap length of the filter to substantially twice the over sample rate will arise, making it difficult to realize. For this reason, by adding a multiplexing process using a multiplexing unit 1603 to the first part of the down sampling process, the problem of the unexpected defeat through carelessness has been avoided. This will be described with reference to FIG. 18.

First, FIG. 18A shows the complex impulse signal. Since this is originally a signal of three systems consisting of a real part and an imaginary part, this has six elements, but is shown simplified. When this complex impulse signal is processed by the multiplexing unit 1603 consisting of fir filters whose tap coefficients are [11 . . . 1] (n pieces), n pieces of complex impulse signals are successively outputted as shown in FIG. 18B. When these are down sampled to 1/n by a down-sampling circuit 1604, the problem of the unexpected defeat through carelessness can be avoided because, of n pieces, only one is always picked up as shown in FIG. 18C.

Next, in FIG. 16, the input signal is delayed by the delay circuit 1609 by processing delay time over a path from the reference filter to the down-sampling circuit 1604 to time the input signal to the impulse signal in advance, and the complex impulse signal will be subtracted from the delay circuit 1609 output.

This subtraction result will be finally band-limited by the band limiting filter, and an oversampling process by an over-sampling circuit 1605 and a smoothing process by a smoothing filter 1606 will be further performed. A carrier wave signal will be delayed by delay circuits 1610 and 1611 by processing delay time over a path from the amplitude control unit to the smoothing filter 1606 in advance to complex-multiply an output signal from the smoothing filter by a quadrature modulator 1607 and to add and compose by a carrier superimposition device 1608. Then, peak amplitude of a three-carrier composite signal and impulse response amplitude to be generated by the impulse signal coincide with each other in position and amplitude on the basis of the principle of superposition of the linear circuit, and since the phase is reversed, the amplitude component that exceeded the peak in the output is suppressed and the peak factor can be limited to the set value.

In this respect, even in a peak factor reduction device expanded to the multi-carrier system shown in the present embodiment, the structure is arranged in multistage and in tandem in the same manner as in FIG. 2, whereby the peak limiting effect can be further enhanced.

As described above, in the conventional technique, the signal has been uniformly changed by a time period corresponding to the tap length of the filter, whereas in the present invention, since a signal of impulse property is used, when erasing the peak amplitude, only the close proximity portion of the peak amplitude is affected, and the influence on the deterioration in signal quality can be reduced. Therefore, in the same deterioration in signal quality as in the conventional technique, the peak factor reduction effect can be further enhanced. In addition, according to the present invention, it becomes possible to reduce the peak factor even in the multi-carrier signal.

The present invention may be provided in other forms then the specific embodiments described hereinabove. For example, the present invention may have various applications, such as to a base band signal processing device and a radio transmitter, as described below.

A base band signal processing device according to the present invention employs a peak factor reduction device. This peak factor reduction device comprises a reference filter for band-limiting complex input signals, including two types of base band signals serving as real parts and imaginary parts, respectively; a first over-sampling circuit for increasing the sampling rates of output signals from the reference filter by interpolation; and a first smoothing filter for eliminating an unnecessary image frequency included in the output signals from said first over-sampling circuit. An amplitude control unit is provided for complex-multiplying output signals from the first smoothing filter through the use of a complex carrier wave signal, and when an amplitude component of a signal obtained by adding the real part and the imaginary part respectively exceeds the set value, outputting a complex impulse signal having an amplitude proportionate to the excess portion. A multiplexing unit is provided for multiplying a successive number of the complex impulse signals that are repeated by the over sampling ratio of said first over-sampling circuit, and a down-sampling circuit operates to reduce the sampling rate by eliminating output signals from said multiplexing unit according to the rate of increase in sampling rate of said first over-sampling circuit. A delay circuit operates to delay complex input signals by a time corresponding to the propagation delay occurring in a processing system from the reference filter to the down-sampling circuit; and a subtractor is provided for subtracting the output signal of said down-sampling circuit from the output signal of said delay circuit. The peak factor reduction device further includes a band limiting filter for band-limiting the output signal from said peak factor reduction device; a second over-sampling circuit for increasing the sampling rate of an output signal from said band limiting filter by interpolation; a second smoothing filter for eliminating any unnecessary image frequency included in the output signal from the second over-sampling circuit; a quadrature modulator for complex-multiplying output signals from the smoothing filter through the use of a complex carrier wave signal; and a carrier superimposition device for adding output signals from the quadrature modulator for each real part and for each imaginary part.

A radio transmitter in accordance with the present invention comprises a spreader for spreading one or more digital modulation signals through the use of a spreading code; a multiplexing unit for multiplexing the spread signals; an interpolator for over-sampling an output signal from said multiplexing unit; and a reference filter for inputting an output signal from said interpolator and band-limiting a complex input signal of plural systems in which two types of base band signals are made into a real part and an imaginary part, respectively. A first over-sampling circuit operates to increase the sampling rate of an output signal from the reference filter by interpolation for outputting; a first smoothing filter eliminates any unnecessary image frequency included in the output signal from said first over-sampling circuit; an amplitude control unit operates to complex-multiply output signals from the first smoothing filter through the use of a complex carrier wave signal, and, when an amplitude component of a signal obtained by adding the real part and the imaginary part respectively exceeds a set value, outputs a complex impulse signal having an amplitude proportionate to the excess portion. The radio transmitter further includes a peak factor reduction device having a multiplexing unit for multiplying a successive number of the complex impulse signals that are repeated by the over-sampling ratio of the first over-sampling circuit; a down-sampling circuit for reducing the sampling rate by eliminating output signals from the multiplexing unit according to the rate of increase in sampling rate of the first over-sampling circuit; a delay circuit for delaying complex input signals by a time corresponding to the propagation delay occurring in a processing system from said band-limiting filter to said down-sampling circuit; and a subtractor for subtracting the output signals of said amplitude control unit from the output signals of said delay circuit. A band limiting filter operates to band-limit the output signal from the peak factor reduction device; and a second over-sampling circuit operates to increase the sampling rates of output signals from the band-limiting filter by interpolation. A second smoothing filter eliminates an unnecessary image frequency included in the output signal from the second over-sampling circuit; a quadrature modulator complex-multiplyies output signals from the smoothing filter through the use of a complex carrier wave signal; and a carrier superimposition device addes the output signals from said quadrature modulators for each real part and for each imaginary part. A digital-to-analog converter is provided for converting a digital output signal, that is output from the carrier superimposition device, to an analog signal for outputting. There are also provided a filter for smoothing analog output signal; a frequency conversion unit; a power the amplifier; and a control unit. The amplitude control unit has: an absolute value circuit for outputting an absolute value based on the real part and the imaginary part of the output signal from the reference filter; and a dead zone circuit for outputting an excess portion of an output signal from the absolute value circuit exceeding a predetermined value. The control unit supplies a set value signal of the dead zone circuit to said peak factor reduction device.

In the radio transmitter described above in the first part of the digital-to-analog converter, there is provided a digital predistortion device having an inverse function of nonlinear input-output characteristic of the power amplifier as an input-output characteristic.

What is claimed is:

1. A peak factor reduction device, comprising:
   a reference filter for band-limiting a complex input signal including two white base band signals having a uniform spectrum as a real part and an imaginary part, respectively;
   a first delay circuit for delaying a complex input signal by a time corresponding to the propagation delay of said reference filter;
   an amplitude control unit for outputting a complex impulse signal having an amplitude proportionate to an excess portion, when an amplitude component of an output signal from said reference filter exceeds a set value; and
   a subtractor for subtracting the output signal of said amplitude control unit from the output signal of said first delay circuit.

2. The peak factor reduction device according to claim 1, wherein said amplitude control unit comprises:
   an absolute value circuit for outputting an absolute value based on the real part and the imaginary part of the output signal from said reference filter;
   a dead zone circuit for outputting an excess portion of an output signal from said absolute value circuit;
   an impulse generating circuit for waveform-shaping an output signal from said dead zone circuit and generating an impulse signal having an amplitude proportionate to the amplitude of the output from said dead zone circuit exceeding a predetermined value;
   a first divider for dividing the output signal from said absolute value circuit by the real part of the output signal from said reference filter and outputting a cosine component of a complex signal;
   a second divider for dividing the output signal from said absolute value circuit by the imaginary part of the output signal from said reference filter and outputting a sine component of the complex signal;
   second and third delay circuits for delaying the output from said first and second dividers corresponding to the processing delay of said impulse generating circuit; and
   first and second multipliers for generating a real part and an imaginary part of a complex impulse signal by multiplying an output signal from said impulse generating circuit by output signals from said first and second delay circuits.

3. The peak factor reduction device according to claim 2, wherein said impulse generating circuit comprises:
   a fourth delay circuit for delaying an output signal from said dead zone circuit by one sample time;
   a differentiation circuit for performing a waveform differential operation by taking the difference between two successive samples of the output signal from said dead zone circuit;
   a fifth delay circuit for delaying the output signal from said differentiation circuit by one sample;
   a third multiplier for taking products between the output signal from said differentiation circuit and each sample of the output signal from said fifth delay circuit;
   a negative value judgment circuit for outputting an impulse signal having a unit amplitude when the output from said third multiplier is a negative value;
   a gain circuit for normalizing the output signal from said negative value judgment circuit at the maximum value of an impulse response of said reference filter; and
   a fourth multiplier for taking products between the output signal from said gain circuit and each sample of the output signal from said third multiplier.

4. The peak factor reduction device according to claim 1, wherein said amplitude control unit comprises:
   an absolute value circuit for outputting an absolute value based on the real part and the imaginary part of output signal from said reference filter;
   a dead zone circuit for outputting an excess portion of an output signal from said absolute value circuit;
   a gain circuit for multiplying the output signal from said dead zone circuit by the reciprocal of the maximum value of the impulse response of the filter;
   a first divider for dividing the output signal from said absolute value circuit by the real part of the output signal from said reference filter and outputting a cosine component of a complex signal;
   a second divider for dividing the output signal from said absolute value circuit by the imaginary part of the output signal from said reference filter and outputting a sine component of the complex signal;
   second and third delay circuits for delaying the output from said first and second dividers corresponding to the processing delay of said impulse generating circuit; and
   first and second multipliers for generating a real part and an imaginary part of a complex impulse signal by multiplying an output signal from said impulse generating circuit by output signals from said first and second delay circuits.

5. The peak factor reduction device according to claim 2, wherein, when a sum of absolute values for the real part and the imaginary part of the output signal from said reference filter is equal to or less than the set value of said dead zone circuit, the operation of said amplitude control unit is suspended.

6. The peak factor reduction device according to claim 1, wherein a plurality of peak factor reduction devices are used and these devices are connected in cascade.

7. A base band signal processing device, comprising the peak factor reduction device specified in claim 1, and a band limiting filter for band-limiting the output signal from a peak factor reduction device.

8. The peak factor reduction device according to claim 2, wherein said amplitude control unit comprises:
an absolute value circuit for outputting an absolute value based on the real part and the imaginary part of the output signal from said reference filter;
a dead zone circuit for outputting an excess portion of a high order output signal from said absolute value circuit exceeding a predetermined value;
a reciprocal circuit for outputting a reciprocal of an output signal from said absolute value circuit;
an impulse generating circuit for generating an impulse signal having an amplitude proportionate to the result obtained by multiplying the output signal from said dead zone circuit by the output signal from said reciprocal circuit;
a sixth delay circuit for delaying an input signal to said amplitude control unit in response to the processing delay of said impulse generating circuit; and
a third multiplier for multiplying an output signal from said impulse generating circuit by an output signal from said second delay circuit.

9. A radio transmitter, comprising:
a spreader for spreading at least one or more digital modulation signals through the use of a spreading code;
a multiplexing unit for multiplexing said spread signals;
an interpolator for oversampling an output signal from said multiplexing unit;
a peak factor reduction device, having: a reference filter for inputting an output signal from said interpolator and band-limiting a complex input signal, including two types of base band signals as a real part and an imaginary part, respectively; a delay circuit for delaying a complex input signal by a time corresponding to the propagation delay of said reference filter; an amplitude control unit for outputting a complex impulse signal having an amplitude proportionate to an excess portion, when an amplitude component of an output signal from said reference filter exceeds a set value; and a subtractor for subtracting the output signal of said delay circuit from the output signal of said amplitude control unit;
a digital-to-analog converter for converting a digital signal, that is output from said peak factor reduction device, to an analog signal; and
a filter for smoothing said analog output signal; a frequency modulation unit; a power amplifier; and a control unit.

10. The radio transmitter according to claim 9, wherein said amplitude control unit has: an absolute value circuit for outputting an absolute value based on the real part and the imaginary part of the output signal from said reference filter; and a dead zone circuit for outputting an excess portion of an output signal from said absolute value circuit exceeding a predetermined value, and wherein said control unit supplies a set value signal of said dead zone circuit to said peak factor reduction device.

11. The radio transmitter according to claim 10, wherein, between said base band signal processing device and a digital-to-analog converter, there is provided a digital pre-distortion device having an inverse function of a nonlinear input-output characteristic of a power amplifier as the input-output characteristic.

12. A peak factor reduction device, comprising:
a reference filter for band-limiting a plurality of complex input signals, including two types of base band signals as a real part and an imaginary part respectively;
an over-sampling circuit for increasing the sampling rate of output signals from said reference filter by interpolation for outputting;
a smoothing filter for eliminating an unnecessary image frequency included in the output signals from said over-sampling circuit;
an amplitude control unit for complex-multiplying output signals from said smoothing filter through the use of a complex carrier wave signal, and, when the amplitude component of a signal obtained by adding the real part and the imaginary part, respectively, exceeds a set value outputting complex impulse signals having an amplitude proportionate to the excess portion;
a multiplexing unit for multiplying a successive number of said complex impulse signals in time by the over-sampling ratio of said over-sampling circuit:
a down-sampling circuit for reducing the sampling rate by eliminating output signals from said multiplexing unit by the rate of increase in sample rate of said over-sampling circuit;
a first delay circuit for delaying a plurality of complex input signals by a time corresponding to the propagation delay occurring in a processing system from said reference filter to said down-sampling circuit; and
a subtractor for subtracting the output signals of said down-sampling circuit from the output signals of said first delay circuit, respectively.

13. The peak factor reduction device according to claim 12, wherein said amplitude control unit comprises:
a quadrature modulator for complex-multiplying output signals from the smoothing filter by a complex carrier wave signal;
a carrier superimposition device for adding the output from said quadrature modulator;
an absolute value circuit for outputting an absolute value based on the real parts and the imaginary parts of the output signals from said carrier superimposition device;
a dead zone circuit for outputting an excess portion of output signals from said absolute value circuit exceeding a predetermined value;
a reciprocal circuit for outputting the reciprocal of an output signal from said absolute value circuit;
an impulse generating circuit for generating an impulse signal having an amplitude proportionate to the result obtained by multiplying the output signal from said dead zone circuit by the output signal from said reciprocal circuit;
a second delay circuit for delaying an input signal to said amplitude control unit according to the processing delay of said impulse generating circuit; and
a second multiplier for multiplying an output signal from said impulse generating circuit by an output signal from said second delay circuit.

14. The peak factor reduction device according to claim 13, wherein said impulse generating circuit includes:
a third delay circuit for delaying an output signal from said dead zone circuit by one sample time;
a differentiation circuit for performing a waveform differential operation by taking the difference between two successive samples of the output signal from said dead zone circuit;
a fourth delay circuit for delaying the output signal from said differentiation circuit by one sample time;

a third multiplier for taking products between the output signal from said differentiation circuit and each sample of the output signal from said fourth delay circuit;

a negative value judgment circuit for outputting an impulse signal having a unit amplitude when the output from said third multiplier is a negative value;

a gain circuit for normalizing the output signal from said negative value judgment circuit at the maximum value of impulse response of said reference filter; and a fourth multiplier for taking products between the output signal from said gain circuit and each sample of the output signal from said third delay circuit.

15. The peak factor reduction device according to claim 12, wherein a plurality of peak factor reduction devices are connected in cascade.

* * * * *